United States Patent Office 3,054,142
Patented Sept. 18, 1962

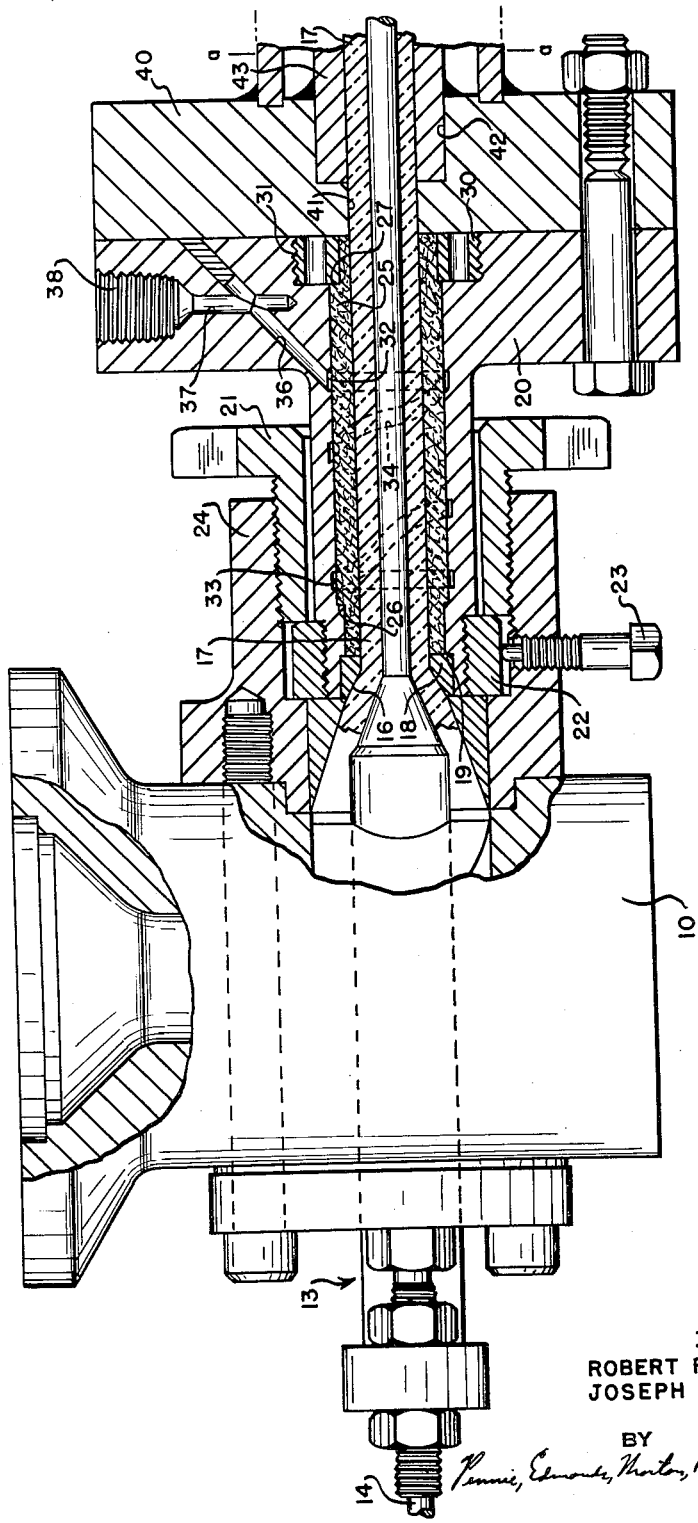

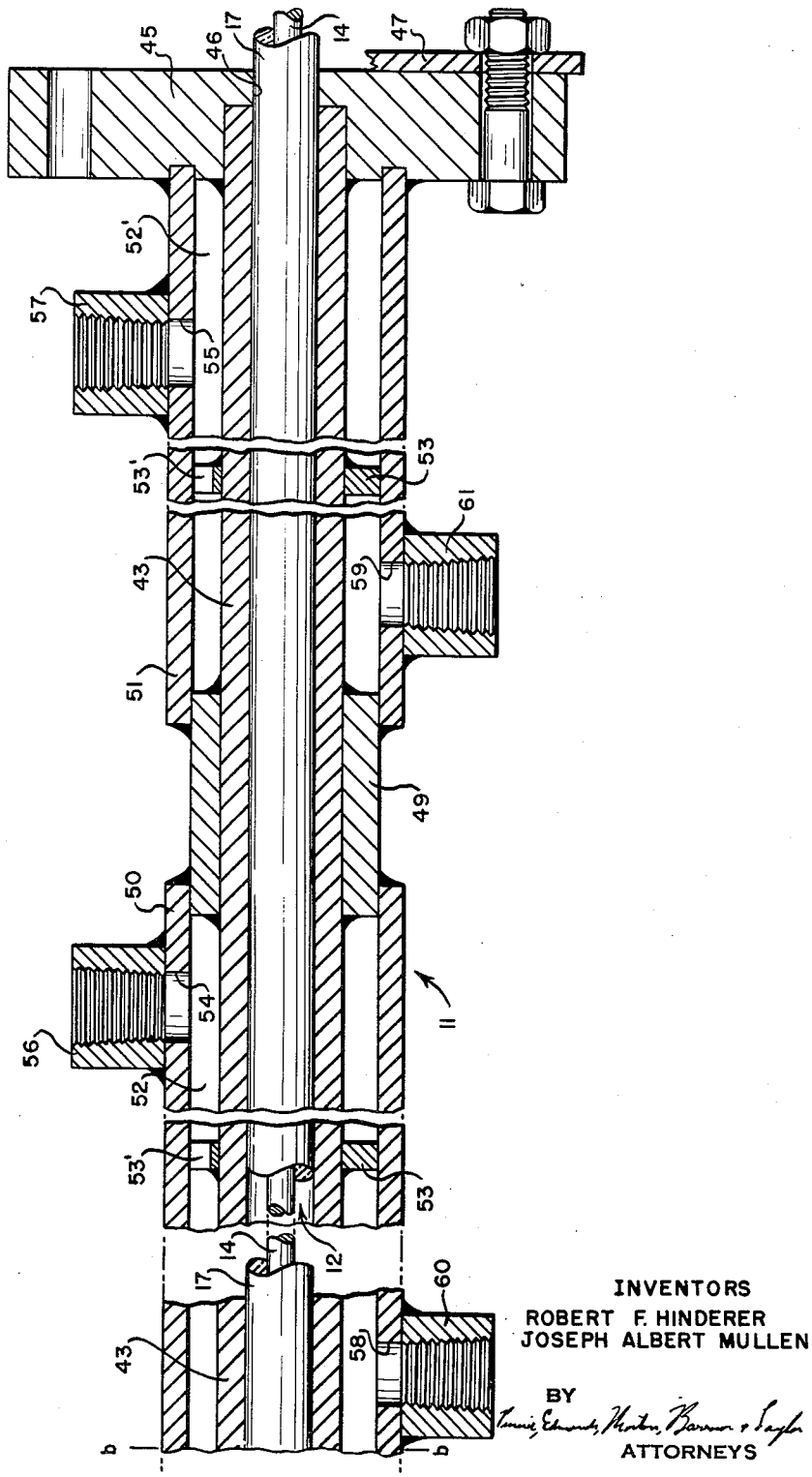

3,054,142
EXTRUSION OF THERMOSETTING
POLYMERIC MATERIALS
Robert F. Hinderer, Marion, and Joseph A. Mullen, Jonesboro, Ind., assignors to Anaconda Wire and Cable Company, a corporation of Delaware
Filed Oct. 6, 1959, Ser. No. 844,721
3 Claims. (Cl. 18—13)

This invention relates to the extrusion and curing of thermosetting polymeric materials. More particularly, it provides a method and apparatus for forming an extended shape composed of a thermosetting polymer wherein the material is passed first through a die orifice, then through a length of lubricant-saturated porous tubing, and finally through a curing and sizing tube heated to the curing temperature of the material.

It is common practice to form extruded articles of thermosetting polymeric material by forcing the uncured material through a die orifice and advancing the resulting extrusion through an extended jacket containing high-pressure steam superheated to the curing temperature. This method is widely used to form continuous coverings of polymeric insulation about electrical conductors. A recognized disadvantage of this method, however, is that it does not lend itself to forming dimensionally precise extruded shapes. For example, rubber insulations or jackets applied in this fashion cannot be acurately controlled as to diameter throughout their length. Surfaces of the extruded polymer cannot be made glossy smooth. Also, when an insulating polymer such as rubber or cross-linked polyethylene is applied to a conductor by this method, moisture from the high-pressure steam to which the polymer is exposed during the curing process impairs its dielectric properties.

The present invention overcomes these disadvantages by providing a method and apparatus for extruding and curing thermosetting materials which is characterized in that the polymer is confined by the walls of a sizing passage during curing, and the heating medium is never brought into direct contact with the extruded material during the curing process. Thus, there is no chance of absorption of the heating medium by the material. Also, the material is closely confined and sized throughout the entire curing stage so that its dimensions are acurately controlled and a very smooth surface is formed on the cured product. To facilitate the passage of the extrusion through the closely confining curing and sizing passage, the invention provides novel lubricating means capable of forming a film of lubricant over the surface of the extrusion which is effective throughout the entire process. The new lubricating means is unique in that it continuously forms and renews an uninterrupted film of lubricant over the entire surface of a longitudinally extended portion of the extended polymer while it is closely confined in such passage immediately adjacent the die orifice.

In the apparatus of the invention, an extruder head is provided having a die orifice through which thermosetting polymeric material is adapted to be continuously forced under pressure. An elongated tubular structure defines a sizing and curing passage extending from the die orifice and comprising a lubricating section and a curing section. The lubricating section comprises a relatively short length of tubing of porous material disposed adjacent the die orifice. Surrounding the porous tubing is a casing forming a chamber into which lubricant under pressure may be delivered. Thence the lubricant passes through the porous walls of the tubing to form a continuous film of lubricant on the surface of the extruded polymeric material as it advances through the porous tubing. The curing section comprises a sizing tube joined to the end of the lubricating section and having a bore of substantially uniform cross section throughout its length corresponding to the cross section desired in the cured extrusion. Heating means surround the sizing tube for heating the extrusion therein to the curing temperature of the polymeric material.

Broadly stated, the new method comprises first continuously forcing thermosetting polymeric material under pressure through an extrusion die orifice. The material is then advanced through a continuously confining passage immediately upon its emergence from the die orifice. An uninterrupted film of lubricant is continuously formed and renewed simultaneously over the entire surface of a longitudinally extended lubricating portion of the passage adjacent the die orifice. This film transfers to and lubricates the surface of the extruded polymeric material passing therethrough and beyond. The wall of the curing portion of the passage remote from the die orifice is heated to at least the curing temperature of the material and the extruded material is advanced through the passage at a rate such that it is completely cured upon reaching the outlet end of the curing portion. The extruded material is sized to the desired cross section as a result of being confined by the walls of the curing passage until after it has become fully cured.

Since the curing and sizing of the extrusion takes place in a continuously confining passage, the walls of which separate the extrusion from the heating medium, the heating medium never comes in contact with the extrusion and thus there is no danger that the medium can impair physical or other properties of the material. Also, this close confinement of the material throughout the extended passage insures that no damage can be done to the skin of the material as it is cured. This critical confinement of the advancing extruded material is made possible primarily by the new lubricating means which can maintain an effective film of lubricant on the extrusion notwithwithstanding the extended length of the curing and sizing passage and the high pressure exerted on the material by the extrusion operation.

A preferred embodiment of the apparatus of the invention, and of the method of the invention involved in its use, are described in detail hereinbelow with reference to the accompanying drawing, wherein FIG. 1a is an elevation partly broken away and in section of the inlet half of a form of the new extruding and curing apparatus; and FIG. 1b is an elevation partly broken away and in section of the outlet half of the new extruding and curing apparatus.

The apparatus of FIG. 1a, at the line a—a, is joined to the apparatus of FIG. 1b at the line b—b.

The apparatus comprises basically two parts, an extruder head 10 and an elongated tubular structure 11 which defines a continuous straight passage 12 extending axially from the outlet end of the extruder head 10. At the inlet end of the extruder head 10, and coaxial with the passage 12, is a guiding assembly 13 through which an electrical conductor 14 may be axially advanced. Thermosetting polymeric material, such as uncured polyethylene cross-linked composition or a rubber composition, is forced from the barrel of an extrusion machine under pressure through a die orifice 16 longitudinally about the conductor 14 at the outlet end of the extruder head. In the die orifice 16, the uncured polyethylene is formed about the conductor 14 as a covering 17 of uniform cylindrical cross section.

The die orifice 16 is defined by an annular die member 18 which is positioned coaxially relative to the passage 12 on the inlet end of the elongated tubular structure 11. Advantageously, the die member 18 fits concentrically into an internal shoulder 19 formed about the inlet end of a casing 20 on the tubular structure 11. About the inlet end of the casing 20 is threaded a ring 22 which rests upon four centering adjustment screws (one of which, 23, is shown) threaded through a collar 24. The collar 24 is bolted to and extends coaxially from the outlet end of the extruder head. The ring 22, and thus the entire inlet end of the tubular structure 11, is brought up against the extruder head 10 by means of a locking member 21 which is threaded into the outer end of the collar 24 against the outer face of the ring 22. Clearance is provided between the outside diameter of the ring 22 and the opposed inside diameter of the collar 24 so that the die orifice 16 may be centered about the outlet end of the extruder head by the adjusting screws 23.

Fitted concentrically within the inside of the outer casing 20 is a length of porous tubing 25 which defines that portion of the passage 12 immediately adjoining the die orifice 16. External shoulders 26 and 27 are formed at opposite end portions of the porous tubing 25. The shoulder 26, which is nearest the extruder head 10, abuts a corresponding internal shoulder on the inside surface of the casing 20. Similarly, the shoulder 27, which is remote from the extruder head 10, is abutted by a retaining nut 30 threaded into an axial seat 31 on the outer face of the casing 20. Encircling the outside surface of the porous tubing 25 between its shoulders 26 and 27 is a chamber defined by grooves formed in the inside surface of the casing 20. This chamber consists of two circular sub-chambers 32 and 33 interconnected by a helical sub-chamber 34. A bore 36, plugged at its outer end, communicates with the sub-chamber 32 and is intersected by a vertical bore 37, thereby providing access through the casing 20 to the chamber 32—34 surrounding the tubing 25. An internally threaded socket 38 at the outer end of the vertical bore 37 is adapted to receive an end fitting on a high-pressure lubricant line.

The porous tubing 25 within the outer casing 20 is formed from oil-permeable sintered powdered metal of the type used for making oil-impregnated bearings. Such a porous material can be permeated by oil under pressure and, at the same time, can continuously confine the polyethylene covering 17 within an unbroken and quite smooth surface. In operation oil is forced through the bores 37 and 36 into the chambers 32—34 and even through the oil-permeable wall of the tubing 25. Thus, an uninterrupted film of oil is continuously maintained over the entire inside surface of the tubing 25, from which it transfers to the advancing surface of the extruded polymer and serves to lubricate it during its entire travel through the passage 12.

Coaxially bolted to the outer face of the casing 20 remote from the extruder head 10 is a first supporting ring 40, the innermost surface 41 of which defines a short portion of the passage 12 adjoining the tubing 25. The first supporting ring 40 includes an internal shoulder 42 on its outer face which receives the inlet end portion of a long curing tube 43. The tube 43 is welded to the supporting ring 40 and extends therefrom substantially to the outer end of the elongated tubular structure 11. Thus, the tube 43 defines the greater part of the passage 12. The outermost end of the tube 43 is welded to and supported by a second supporting ring 45 which also has an innermost surface 46 defining a short terminal portion of the passage 12. The second supporting ring 45 is bolted to a supporting frame 47.

Welded to the periphery of the tube 43 intermediate its ends is a close-fitting sleeve 49. The sleeve 49 underlies the adjacent ends of two tubular jackets 50 and 51 concentrically surrounding and spaced from the tube 43. The supporting rings 40 and 45 support the respective opposite ends of these jackets 50 and 51 so that the jackets form respective annular spaces 52 and 52' about the tube 43 which together extend throughout substantially the entire length of the tube. Each of the jackets 50 and 51 is further supported internally by one or more internal spider rings 53 encircling the tube 43. Holes 53' are formed in each spider ring 53 so that the annular spaces 52 and 52' are not sub-divided.

The jackets 50 and 51 have inlet apertures 54 and 55 respectively extending through their walls which communicate with corresponding internally threaded nipples 56 and 57. Similarly, the jackets 50 and 51 have respective outlet apertures 58 and 59 extending through their walls and communicating with corresponding internally threaded outlet nipples 60 and 61. The outlet apertures 54 and 55 are located at opposite end portions of their respective jackets 50 and 51 from the outlet apertures 58 and 59. Thus, means are provided for circulating a heating fluid, such as high-pressure steam or heated oil, throughout each of the spaces 52 and 52' over substantially the entire length of the tube 43.

In the operation of this new extruding and curing apparatus, the electrical conductor 14 is continually passed axially through the guide assembly 13 of the extruder head and through the die orifice 16. At the same time, uncured thermosetting polymer is forced under pressure into the extruder head and out through the die orifice 16 to form the continuous covering 17 about the conductor 14. The newly-covered conductor then enters the continuous straight elongated passage 12, the first portion of which is defined by the porous tubing 25. An oil or other liquid lubricant is continuously forced into the chambers 32—34 surrounding the tubing 25, whence it passes through the porous wall of the tubing to form an uninterrupted film of oil over the entire outer surface of the uncured extrusion 17 therewithin. By forming the film of lubricant in this manner, the covered conductor is effectively lubricated for its entire travel through the extended passage 12. Also, the film of oil is continuously formed and renewed as the covered conductor passes through the tubing 25 so that no breaks in the lubricant occur.

The oiled extrusion then enters the long tube 43 which provides a single curing and sizing stage. High-pressure steam or heated oil at a temperature higher than the curing temperature of the rubber covering 17 is circulated through each of the spaces 52 and 52' formed by the jackets 50 and 51 about the tube 43. Since the spaces 52 and 52' are separated from one another and the heating fluid introduced in each is at uniform temperature, the entire length of the tube 43 is maintained at a substantially uniform temperature. When only a single heating space is provided about a curing tube, as in conventional apparatus, the heating fluid is often at considerably lower temperature by the time it exits from the space and thus cannot uniformly heat the curing tube.

The extrusion speed of the apparatus is correlated with the length of the tube 43 so that by the time the covered conductor reaches the outlet end of the curing stage, at the second supporting ring 45, curing of the polymer is complete. The internal cross section of the tube 43, which is the same as the entire internal cross section of the passage 12, is that desired in the finished article. Hence, the covering 17 is molded to size as it is cured and thus its dimensions are closely controlled and its surface made very smooth. Moreover, at no time during passage through the curing tube 43 is the polymer covering 17 exposed to the heating medium circulating in the spaces 52 and 52' so that there can be no impairment of the properties of the extrusion by such medium.

We claim:

1. Apparatus for extruding and curing thermosetting polymeric material about an electrical conductor of indefinite length, comprising an extruder head for pressurizing said material and having an open exit end, a separate annular die located downstream of the exit end of said extruder head and defining a longitudinally extended orifice substantially equal in shape to that desired in the finished extrusion, said conductor being adapted to be passed longitudinally through said annular die whereby a cylindrical cover of said polymeric material is applied about said conductor, a separate tubular lubricating element of porous sintered powdered metal located downstream of said annular die and defining a substantially smooth and uninterrupted surface which is equal in cross section to the die orifice and impervious to said polymeric material, a casing mounted about said porous tube and forming therewith a substantially enclosed chamber, said chamber comprising two annular sub-chambers disposed about said porous tubular lubricating element at opposite end portions thereof and a helical sub-chamber interconnecting said annular sub-chambers, means through which a lubricant under pressure may be delivered into said chamber and thence through said porous tubing, whereby a continuously renewed film of lubricant may be caused to flow into contact with the surface of the extruded polymeric material about said conductor as it advances through said porous tubing, a separate externally heated tubular curing element downstream of said lubricating element and equal in cross section to that of the die orifice, a jacket forming at least one longitudinally elongated annular space around said curing element which extends throughout substantially the entire length thereof, and means for introducing a heating fluid into said annular space for heating said curing element and the extrusion therein to the curing temperature of the polymeric material.

2. A method of continuously forming a cross-linked polyethylene extrusion which comprises (a) continuously forcing an uncured polyethylene composition containing a vulcanizing agent under pressure through a longitudinally extended smooth extrusion die orifice, (b) advancing the extruded uncured polyethylene composition through a separate porous tubular lubricating element of porous sintered powdered metal which is located downstream of said die orifice and defines a substantially smooth and uninterrupted surface and which is equal in cross-section to the die orifice, while simultaneously forcing a lubricant under pressure through the outside wall of the porous tubular lubricating element to continuously form and renew an uninterrupted film of lubricant over the surface of the advancing uncured polyethylene composition, and thereafter (c) advancing the lubricated uncured polyethylene composition into and through a separate exteriorly heated non-porous tubular curing element which is located downstream of said tubular lubricating element and which is equal in cross-sectional area to that of the die orifice, while simultaneously heating said curing element to a temperature at which the polyethylene composition undergoes cross-linking, the rate of advance of the uncured polyethylene composition through the curing element being such that the composition is completely cured upon reaching the outlet end of said curing element.

3. A method of continuously extruding a sheath of cross-linked polyethylene about an electrical conductor of indefinite length which comprises (a) continuously passing said conductor axially through a longitudinally extended smooth extrusion die orifice, (b) continuously forcing an uncured polyethylene composition containing a vulcanizing agent under pressure through the die orifice to form a sheath about said conductor, (c) advancing the sheathed conductor through a separate porous tubular lubricating element of porous sintered powdered metal located downstream of said die orifice and defining a substantially smooth an uninterrupted surface while simultaneously forcing a lubricant under pressure through the outside wall of the porous tubular lubricating element to continuously form and renew an uninterrupted film of lubricant over the entire surface of the advancing uncured sheathed conductor, and thereafter (d) advancing the lubricated uncured sheathed conductor into and through a separate exteriorly heated non-porous tubular curing element located downstream of said tubular lubricating element while simultaneously heating said curing element to a temperature at which the polyethylene composition undergoes cross-linking, the rate of advance of the uncured sheathed conductor through the curing element being such that the polyethylene composition surrounding the conductor is completely cured upon reaching the outlet end of said curing element, the cross-sectional area of both the tubular lubricating element and the curing element being that of the die orifice.

References Cited in the file of this patent

UNITED STATES PATENTS

| | | |
|---|---|---|
| 2,579,815 | Gialanella | Dec. 25, 1951 |
| 2,581,769 | Olson | Jan. 8, 1952 |
| 2,597,553 | Weber | May 20, 1952 |
| 2,688,153 | Gebauer et al. | Sept. 7, 1954 |
| 2,759,222 | Bowers | Aug. 21, 1956 |